United States Patent
Merlin et al.

(10) Patent No.: US 12,098,655 B2
(45) Date of Patent: Sep. 24, 2024

(54) STATOR RING FOR AN AIRCRAFT TURBINE ENGINE AND AIRCRAFT TURBINE ENGINE FITTED WITH SAME

(71) Applicant: SAFRAN AIRCRAFT ENGINES, Paris (FR)

(72) Inventors: Rémi Merlin, Moissy-Cramayel (FR); Damien Gérard Marcel Jacques Guilmet, Moissy-Cramayel (FR); Romain Mikel Erwan Gouspy, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/262,710

(22) PCT Filed: Jan. 24, 2022

(86) PCT No.: PCT/FR2022/050126
§ 371 (c)(1),
(2) Date: Jul. 24, 2023

(87) PCT Pub. No.: WO2022/162299
PCT Pub. Date: Aug. 4, 2022

(65) Prior Publication Data
US 2024/0254886 A1 Aug. 1, 2024

(30) Foreign Application Priority Data
Jan. 27, 2021 (FR) ...................................... 2100764

(51) Int. Cl.
*F01D 9/04* (2006.01)
(52) U.S. Cl.
CPC ........ *F01D 9/041* (2013.01); *F05D 2220/323* (2013.01); *F05D 2240/12* (2013.01)

(58) Field of Classification Search
CPC .......................................... F01D 25/04
See application file for complete search history.

(56) References Cited

U.S. PATENT DOCUMENTS 10,697,309 B2 * 6/2020 Anderson ............... F01D 9/041
2018/0230836 A1 * 8/2018 Tibbott ................... F01D 25/12

FOREIGN PATENT DOCUMENTS

| FR | 2 948 737 A1 | 2/2011 |
| FR | 3 085 416 A1 | 3/2020 |
| WO | 2011/157956 A1 | 12/2011 |

OTHER PUBLICATIONS

International Search Report mailed May 6, 2022, issued in corresponding International Application No. PCT/FR2022/050126, filed Jan. 24, 2022, 5 pages.

(Continued)

*Primary Examiner* — Courtney D Heinle
*Assistant Examiner* — Danielle M. Christensen
(74) *Attorney, Agent, or Firm* — CHRISTENSEN O'CONNOR JOHNSON KINDNESS PLLC

(57) ABSTRACT

A stator ring for an aircraft turbine engine includes an inner shroud coaxial with an outer shroud. The shrouds are connected to each other by vanes that are each fully integral with the shrouds. The outer shroud has an outer annular surface connected to at least one catch for attaching the stator ring. The inner shroud has an inner annular surface connected to a support member with an abradable coating. At least one of the inner and outer surfaces includes recesses that are situated in line with the vanes and are configured such that the vanes are connected to the corresponding shroud.

9 Claims, 4 Drawing Sheets

(56) References Cited

OTHER PUBLICATIONS

Written Opinion mailed May 6, 2022, issued in corresponding International Application No. PCT/FR2022/050126, filed Jan. 24, 2022, 6 pages.

\* cited by examiner

STATOR RING FOR AN AIRCRAFT TURBINE ENGINE AND AIRCRAFT TURBINE ENGINE FITTED WITH SAME

TECHNICAL FIELD OF THE INVENTION

The invention concerns a stator ring for an aircraft turbine engine and an aircraft turbine engine fitted with such a stator ring.

TECHNICAL BACKGROUND

The technical background comprises the documents FR-A1-2 948 737, FR-A1-3 085 416 and WO-A1-2011/157956.

An aircraft turbine engine comprises a compressor to compress air, in particular to give the air a speed, a pressure and a temperature suitable for burning the air in a combustion chamber with fuel.

A compressor generally comprises several stages, each stage comprising a first rotating bladed member which forms a rotor, and a second stationary bladed member, referred to as a stator ring, which forms a stator, and which is located downstream of the rotor in the flowing direction of the air in the turbine engine.

Each stage of the compressor thus comprises a sectorised stator ring, i.e. a stator ring comprising several stator ring sectors arranged circumferentially end-to-end around a longitudinal axis of the turbine engine. Each sector comprises a plurality of stationary vanes.

A stator ring comprises an external shroud and an internal shroud that are spaced apart, and vanes that connect the external shroud and the internal shroud. The space between the external shroud and the internal shroud forms a flow channel for the air circulating through the compressor.

The sectorised stator rings are complex parts operating in an environment where they are subject to increasing stress (high pressure, temperature and rotor speed), which generates a high number of modes and high vibration levels. The geometries of the stator rings are all very similar in terms of mechanical behaviour. Following a strong vibratory excitation, the energy is efficiently propagated throughout the entire sector by means of the very rigid internal and external shrouds.

The vibration responses predicted by the design criteria or seen in tests after stripping, show that the stator rings have very high vibration levels. During operation of the turbine engine, the vibrations created by the operation of said turbine engine can lead to the creation of significant mechanical loads at the level of the internal and external shrouds and the vanes. These high loads can be responsible for the appearance of cracks.

In particular, the present invention is intended to solve in particular some or all of the above problems.

SUMMARY OF THE INVENTION

To this end, the invention proposes a stator ring for an aircraft turbine engine, said stator ring comprising two coaxial annular shrouds, an internal shroud and an external shroud respectively, connected together by vanes which are each solid and integral with the shrouds, the external shroud comprising an external annular surface connected to at least one attachment catch for attaching the stator ring, and the internal shroud comprising an internal annular surface connected to a support for an abradable coating, characterised in that at least one of said internal and external surfaces comprises recesses which are located in line with the vanes and which are configured so that the vanes are connected to the corresponding shroud, at the level of the recesses, by webs of material which have a thickness less than that of said shroud, and in that said at least one attachment catch is arranged between two series of recesses of the external shroud, and/or said support is arranged between two series of recesses of the internal shroud.

In particular, the invention involves modifying one or more portions of the shrouds by means of recesses located at the ends of the vanes. By using one or more recessed areas, the shrouds can be softened locally. There are many advantages, in particular:
    lowering static stresses;
    attenuating the vibration propagation within the stator ring; and
    reducing the mass of the stator ring.

The recesses located at the ends of the vanes at the level of the internal and external shrouds allow to dampen the vibratory and static responses by locally softening the internal and external shrouds.

In addition, when designing a turbine engine, three main players are involved: mechanics, aerodynamics and integration. Once the various iteration phases have been completed between these three players, it is no longer possible to modify the properties of the stator ring, such as the design of the vanes (aerodynamic part) or the interface between the various parts (integration part).

However, the shape of the internal shroud is a purely mechanical concern and its modification, in particular to create recesses in accordance with the invention, does not therefore affect the design chosen. In this way, the invention allows to influence the vibration behaviour after iteration between the three players, without modifying the design of the flow channel for the air flow circulating in the compressor or at the interfaces.

The invention thus allows to reduce the vibratory and static responses on the stator rings without impacting on the specifications provided by the other players (aerodynamicists' drawings, interface defined by the integration).

In the present application, a series of recesses is taken to mean a plurality of recesses which may take the form of an annular row of recesses evenly distributed around a main axis of the stator ring. At least two series of recesses means having at least two sets of recesses, for example two annular rows of recesses evenly distributed around the axis of the stator ring.

The stator ring, according to the invention, may comprise one or more of the following characteristics, taken in isolation from each other or in combination with each other:
    said internal surface comprises a series of recesses located in line with the leading edges of the vanes and/or a series of recesses located in line with the trailing edges of the vanes;
    said external surface comprises a series of recesses located in line with the leading edges of the vanes and/or a series of recesses located in line with the trailing edges of the vanes;
    the vanes are connected to the internal shroud fitted with recesses by webs of material which have a thickness Evoile-int less than or equal to Evirole-int/3, and preferably less than or equal to Evirole-int/4, Evirole-int being the thickness of the internal shroud in the area comprising the recesses;

the vanes are connected to the external shroud fitted with recesses by webs of material which have a thickness Evoile-ext less than or equal to Evirole-ext/2, and preferably less than or equal to Evirole-ext/2.5, Evirole-ext being the thickness of the external shroud in the area comprising the recesses;

each of the recesses has a generally elongated shape along a camber line of the corresponding vane, each of the recesses having in cross-section and/or in longitudinal section a generally trapezoidal or triangular shape;

each of the vanes is connected to the or each shroud fitted with recesses by two lateral webs of material which extend respectively on the side of the intrados and of the extrados of the vane and which are symmetrical with respect to a median plane passing through the middle of the recess and through an axis of elongation of the vane;

the two webs of material extend from a first plane passing through the corresponding shroud to a second plane passing through one end of the corresponding vane, the first and second planes being parallel and spaced apart.

The present invention also relates to an aircraft turbine engine, comprising at least one stator ring as described above.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
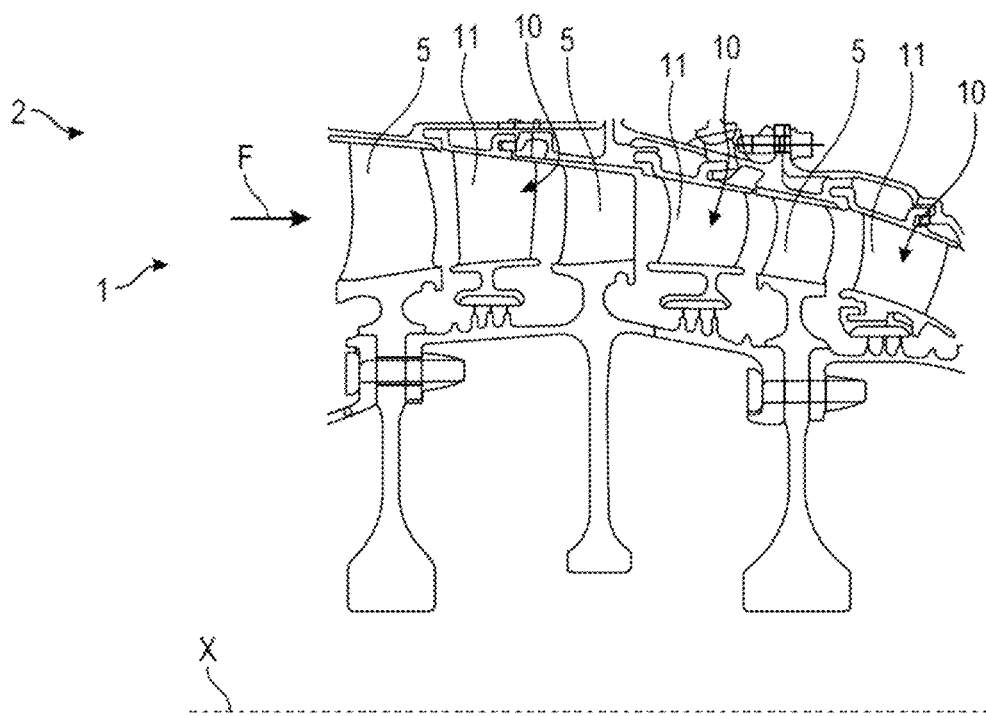
FIG. 1 is a schematic half-sectional view of a high-pressure compressor in a turbine engine.

FIG. 1 shows a high-pressure compressor 1 of a turbine engine 2 for an aircraft, comprising several stages. The compressor 1 comprises a number of annular rows of stationary aerofoil vanes 11 and rows of rotating vanes 5. The vanes 11, 5 extend radially across the compressor 1, through which a primary flow F flows. Each stage of the compressor comprises a sectorised stator ring (shown as 10 in FIG. 2), i.e. a stator ring 10 comprising several stator ring sectors 10' arranged circumferentially end to end around a longitudinal axis X of the turbine engine so as to form the stator ring 10. Each sector 10' comprises a plurality of stationary vanes 11. The stator rings 10 are configured to direct the primary flow F towards the rotating vanes 5. The term "radial" is defined in relation to an axis substantially perpendicular to the longitudinal axis X of the turbine engine 2.

Figure 2:
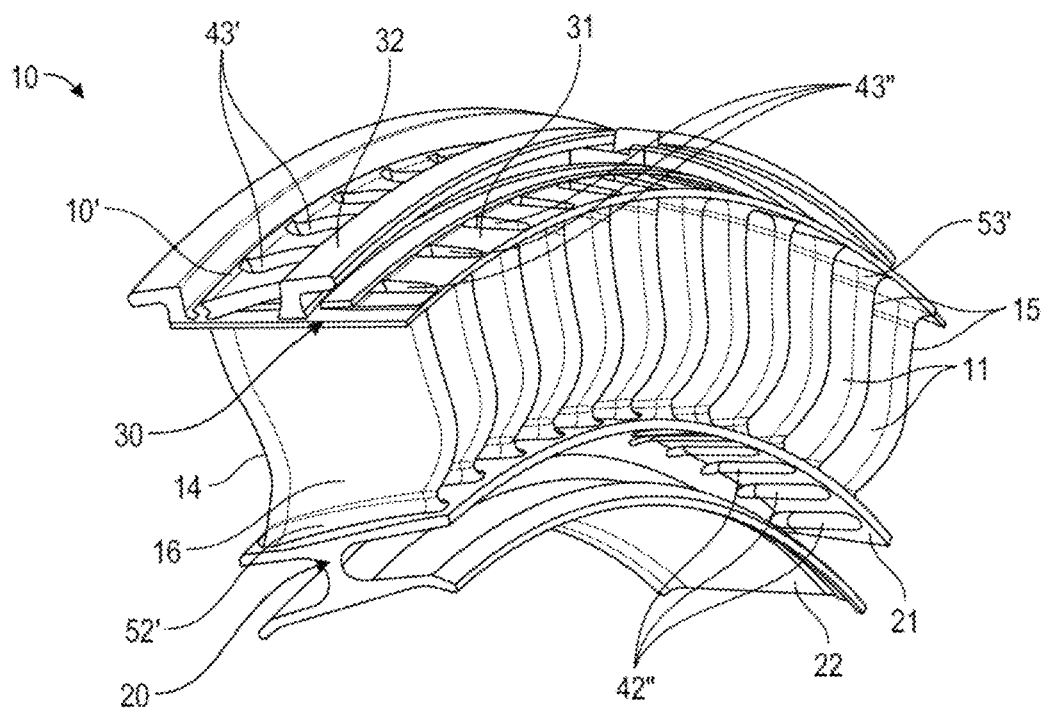
FIG. 2 is a schematic perspective representation of a sector of a stator ring of the high-pressure compressor according to the invention.

As shown in FIG. 2, the stator ring 10 for an aircraft turbine engine comprises an internal shroud 20 and an external shroud 30 which are spaced apart, the external shroud 30 being located around the internal shroud 20. The internal shroud 20 and the external shroud 30 are both coaxial annular parts.

The sectorised stator rings 10 are complex parts operating in an environment where they are subject to increasing stress (high pressure, temperature and rotor speed), generating a high number of modes and high vibration levels. Following a strong vibratory excitation during operation, the energy propagates efficiently through the set of the stator rings 10 or sector by means of the internal 20 and external 30 shrouds.

Conventionally, the terms "internal" and "external" are understood to refer to the axis X of the turbine engine, and the terms "upstream" and "downstream" are understood to refer to the flowing direction of the gases in the turbine engine.

The internal 20 and external 30 shrouds are connected together by the stationary vanes 11. The vanes 11 are each solid and, for example, integral with the shrouds 20, 30.

Figure 3:
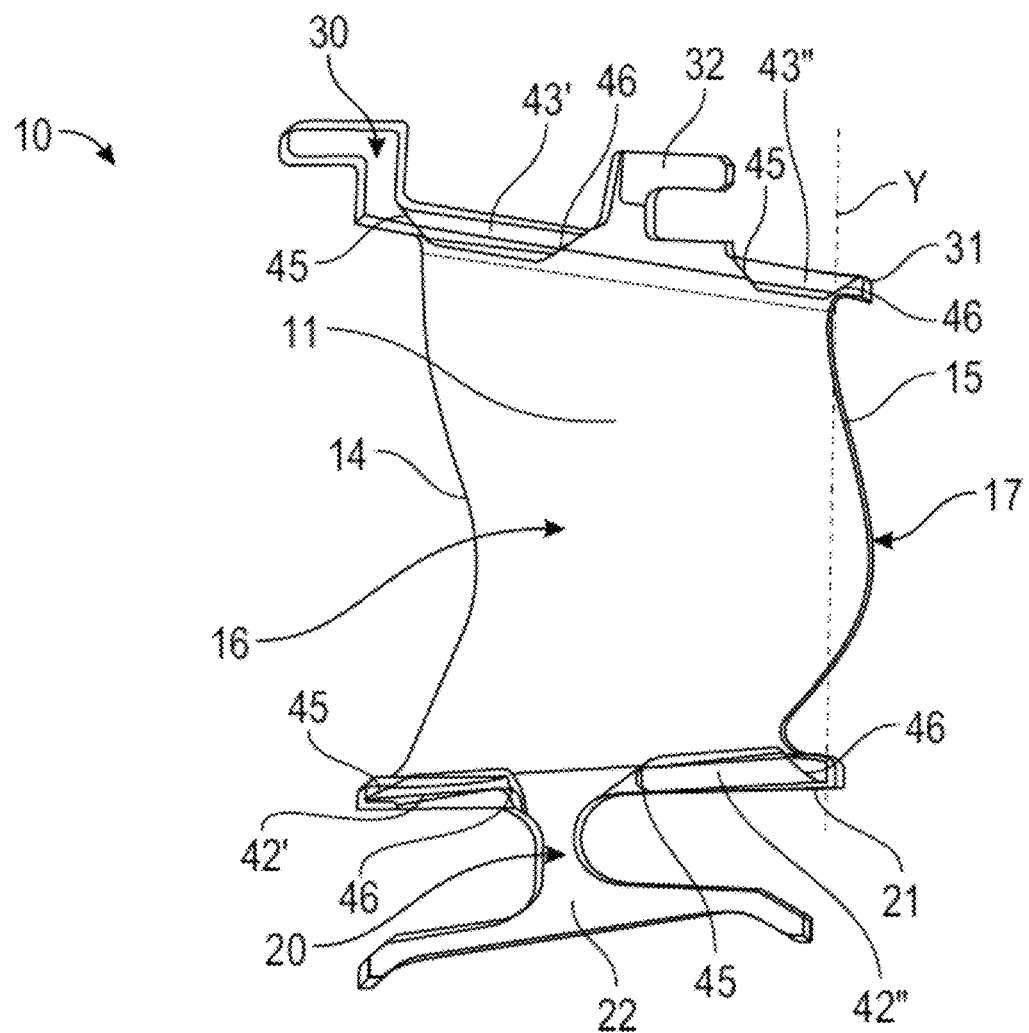
FIG. 3 is a schematic longitudinal section of the sector shown in FIG. 2.

As shown in FIGS. 2 and 3, the external shroud 30 comprises an external annular surface 31 connected to at least one attachment catch 32 for attaching the stator ring 10.

The internal shroud 20 comprises an internal annular surface 21 connected to a support 22 of an abradable coating. In particular, the internal shroud 20 is I-shaped in longitudinal section.

At least one of said internal 21 and external 31 surfaces, and here both, comprise recesses 42', 42", 43', 43" which are located in line with the vanes 11. Depending on the geometric characteristics and the desired mechanical strength of the stator ring, the number of recesses and their geometry can be varied.

In particular, the internal surface 21 comprises a series of recesses 42' located in line with the leading edges 14 of the vanes 11. The internal surface 21 comprises, for example, a series of recesses 42" located in line with the trailing edges 15 of the vanes 11.

In particular, the external surface 31 comprises a series of recesses 43' located in line with the leading edges 14 of the vanes 11. The external surface 31 comprises, for example, a series of recesses 43" located in line with the trailing edges 15 of the vanes 11.

In particular, each of the recesses 42', 42" of the internal surface 21 and each of the recesses 43', 43" of the external surface 31 has a generally elongated shape along a camber or skeleton line C2, C3, respectively camber line C2 at the level of the internal surface 21 and camber line C3 at the level of the external surface 31 of the corresponding vane 11. The geometry of the vane 11 can vary according to the height (i.e. radially), so the recesses 42', 42", 43', 43" follow the camber line of the section at the summit of the vane 11 for the external shroud 30 and at the root of the vane 11 for the internal shroud 20.

Each of the recesses 42', 42", 43', 43" has, for example, a generally trapezoidal or triangular shape in cross-section and/or in longitudinal section with respect to the axis X.

The recesses 42', 42", 43', 43" are in particular cup-shaped and comprise in particular upstream 45 and downstream 46 edges oriented substantially parallel to the axis Y or inclined with respect to this axis.

Figure 4:
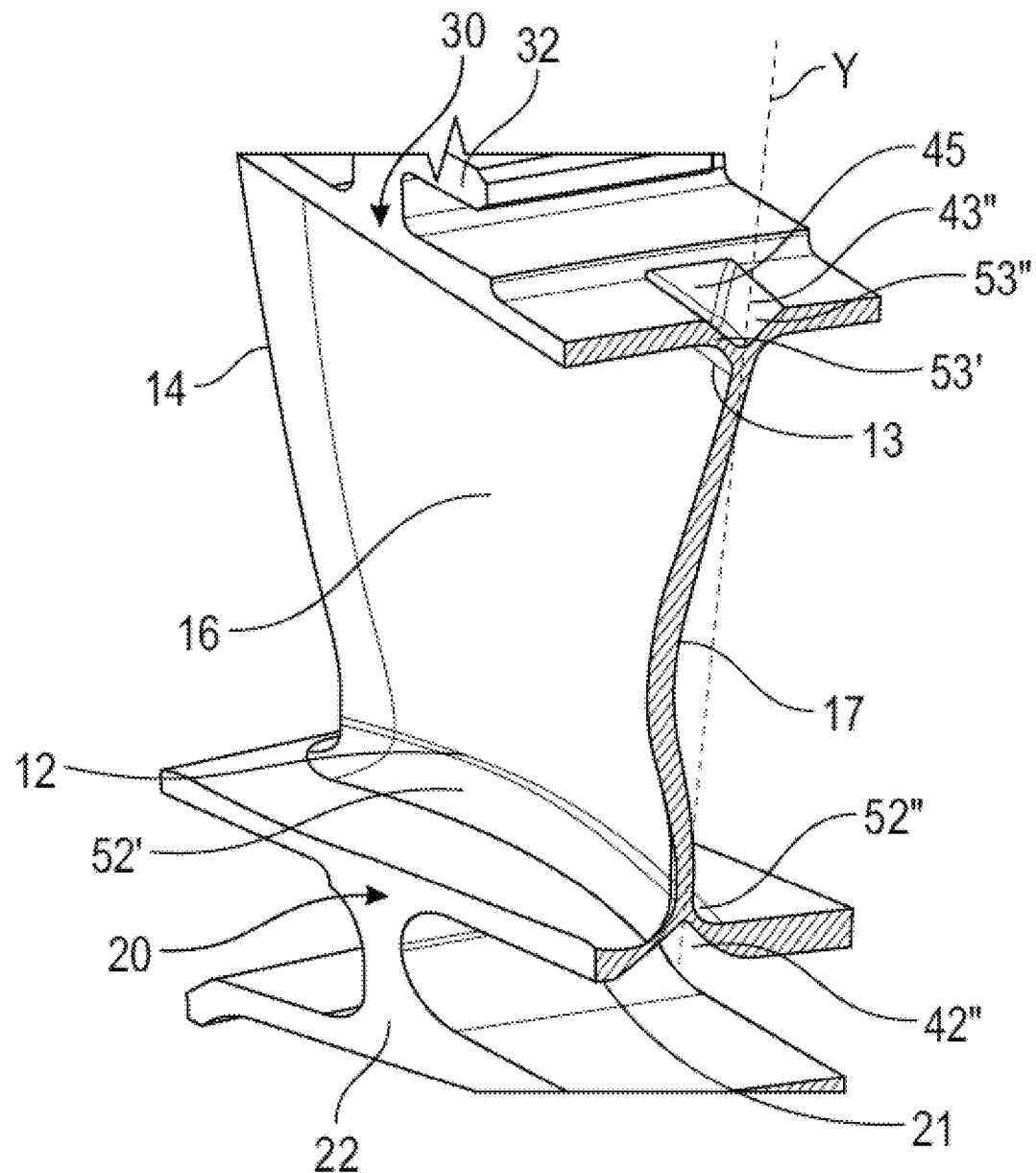
FIG. 4 is a schematic cross-sectional and perspective view of a vane and internal and external shrouds according to the invention, in a cross-section approximately 80% of the chord of the vane shown in FIG. 3.
Figure 5:
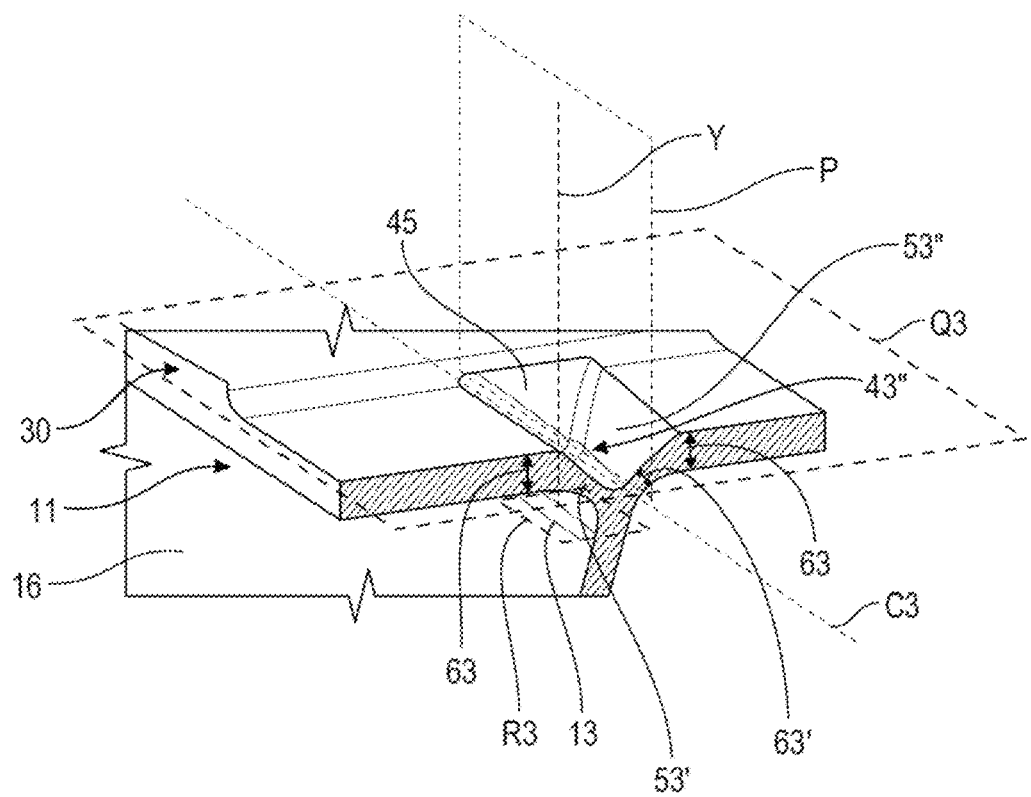
FIG. 5 is a schematic cross-sectional and perspective representation of an external end of the vane and the external shroud according to the invention, in a cross-section approximately 80% of the chord of the vane shown in FIG. 3.
Figure 6:
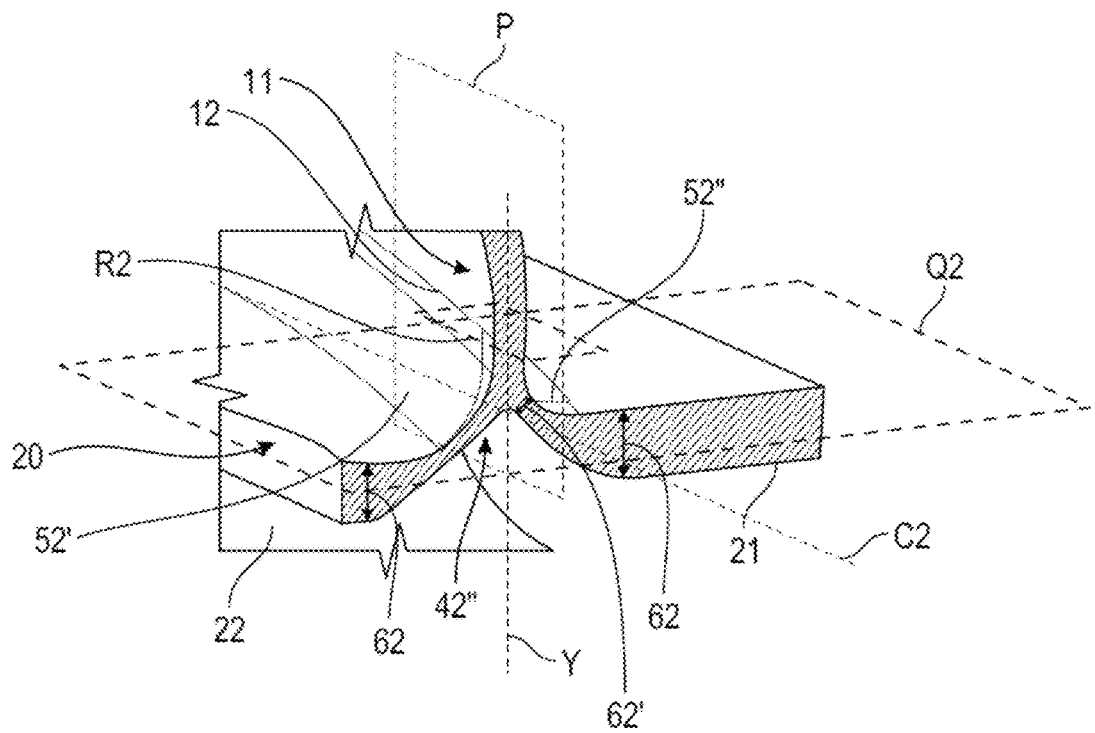
FIG. 6 is a schematic cross-sectional and perspective view of an internal end of the vane and of the internal shroud according to the invention, in a cross-section approximately 80% of the chord of the vane shown in FIG. 3.

FIGS. 4, 5 and 6 are cross-sectional views of the vane 11 and/or the shrouds 20, 30, with a cutting plane that is perpendicular to the shrouds 20, 30 and to the trailing edge 15 of the vane 11 and passing in particular through the bottom of the cup shape defined by the recesses 42", 43" located in line with the trailing edge 15 of the vane 11. If we consider the chord of the vane 11, i.e. the straight line connecting the leading edge 14 to the trailing edge 15, the cutting plane passes substantially at 80% of this chord measured from the leading edge 14 to the trailing edge 15. The cutting plane therefore passes 20% from the trailing edge 15, particularly upstream and close to the axis Y as shown in FIG. 3.

As shown in FIGS. 4, 5 and 6, the internal 21 and external 31 surfaces are configured so that the vanes 11 are connected to the corresponding shroud 20, 30 at the level of the recesses 42', 42", 43', 43" by webs of material 52', 52", 53', 53". The upstream 45 and downstream 46 edges and the material webs 52', 52", 53', 53" of each recess 42', 42", 43', 43" form the aforementioned cup shape.

Each of the vanes 11 is connected to the internal shroud 20 fitted with recesses 42', 42" by two lateral webs of material 52', 52" which extend respectively on the side of an intrados 16 and an extrados 17 of the vane 11 and which are symmetrical with respect to a median plane P passing through the middle of the recess 42', 42" and by an axis of elongation Y of the vane 11 substantially perpendicular to the axis X.

Each of the vanes 11 is connected to the external shroud 30 fitted with recesses 43', 43" by two lateral webs of material 53', 53" which extend respectively on the side of the intrados 16 and of the extrados 17 of the vane 11 and which are symmetrical with respect to the median plane P passing through the middle of the recess 43', 43" and through the axis of elongation Y of the vane 11.

The two webs of material 52', 52" connecting each of the vanes 11 to the internal shroud 20 extend from a first plane Q2 passing through the internal shroud 20 to a second plane R2 passing through a lower or internal end 12 of the corresponding vane 11, the first Q2 and second planes R2 being parallel and at a distance from each other and, for example, perpendicular to the axis Y.

The two webs of material 53', 53" connecting each of the vanes 11 to the external shroud 30 extend from a first plane Q3 passing through the external shroud 30 to a second plane R3 passing through an upper or external end 13 of the corresponding vane 11, the first Q3 and second planes R3 being parallel and at a distance from each other and, for example, perpendicular to the axis Y.

The two webs of material 52', 52" connecting each of the vanes 11 to the internal shroud 20 have a thickness 62' less than the thickness 62 of this internal shroud 20. The thickness 62' of the webs 52', 52", also known as Evoile-int, has a minimum value of 0.5 mm. The area of the internal shroud 20, comprising the recesses 42', 42", has a thickness 62, also known as Evirole-int. The thickness 62' of the webs 52', 52" is, for example, less than or equal to ⅓ of the thickness 62 of the internal shroud 20, and preferably less than or equal to ¼ of the thickness 62 of the internal shroud 20. In other words, Evoile-int is less than or equal to Evirole-int/3, and preferably less than or equal to Evirole-int/4.

The two webs of material 53', 53" connecting each of the vanes 11 to the external shroud 30 have a thickness 63' less than the thickness 63 of this external shroud 30. The thickness 63' of the webs 52', 52", also referred to as Evoile-ext, has a minimum value of 0.5 mm. The area of the external shroud 30, comprising the recesses 43', 43", has a thickness 63, also known as Evirole-ext. The thickness 63' of the webs 53', 53" is for example less than or equal to ½ of the thickness 63 of the external shroud 30, and preferably less than or equal to 1/2.5 of the thickness 63 of the external shroud. In other words, Evoile-ext is less than or equal to Evirole-ext/2, and preferably less than or equal to Evirole-ext/2.5.

Said at least one attachment catch 32 is arranged, for example, between two series of recesses 43', 43" in the external shroud 30. More specifically, at least one attachment catch 32 is arranged between the series of recesses 43' in the external shroud 30 located at the level of the leading edges 14 of the vanes 11 and the series of recesses 43" in the external shroud 30 located at the trailing edges 15 of the vanes 11.

In particular, the support 22 is arranged between two series of recesses 42', 42" in the internal shroud 20. More specifically, the support 22 is arranged between the series of recesses 42' in the internal shroud 20 located at the level of the leading edges 14 of the vanes 11 and the series of recesses 42" in the internal shroud 20 located at the level of the trailing edges 15 of the vanes 11.

By using one or more recesses 42', 42", 43', 43", the invention allows to reduce the static stresses of the stator ring, in particular by locally softening the shrouds 20, 30. For example, for a vane 11 which has a maximum stress at the level of its leading edge 14 close to the external shroud 30, it is possible to reduce the static stresses of the vane 11, in particular by 8%, i.e. 25 MPa, by means of all or some of the recesses 42', 42", 43', 43".

The recesses 42', 42", 43', 43" also allow to attenuate the vibration propagation in the stator ring. The softer the shrouds 20, 30, the more the vibration propagation is attenuated. This depends on the type of vibration mode concerned and on the location of its maximum criticality. In particular, it is possible to analyse the vibration responses using the energy criterion of the modal responses.

Depending on requirements, the desired attenuation can be mode-specific or mode range-specific. This can be achieved by modifying the thickness of the webs or dividing the recess areas differently (vane to vane), or by adapting the geometry of the recesses to the vibratory requirements.

The recesses also allow to have a positive effect on the mass of the stator ring. The post-design modifications by means of a material removal contribute to a reduction in mass, of up to 4% for a sector 10' of stator rings 10, for example.

In addition, the modification of the shrouds 20, 30 by the recesses 42', 42", 43', 43" has no impact on the other players in the design.

The production of this type of geometry, i.e. after recesses, is particularly suited to additive manufacturing, in particular referred to as laser fusion.

The present invention also relates to an aircraft turbine engine 2, comprising at least one stator ring 10 as described above.

The invention claimed is:

1. A stator ring for an aircraft turbine engine, said stator ring comprising an internal shroud coaxial with an external shroud, wherein the internal shroud and the external shroud are connected together by vanes which are each solid and integral with the shrouds, the external shroud comprising an external annular surface connected to at least one attachment catch configured to attach the stator ring, and the internal shroud comprising an internal annular surface connected to a support for an abradable coating, wherein at least one of said internal and external annular surfaces comprises recesses which are located in line with the vanes and which are configured so that the vanes are connected to the corresponding shroud, at a level of the recesses, by webs of material which have a thickness less than that of said shroud, and wherein said at least one attachment catch is arranged between two series of recesses in the external shroud, and/or said support is arranged between two series of recesses in the internal shroud.

2. The stator ring according to claim 1, wherein said internal surface comprises a series of recesses located in line with leading edges of the vanes and/or a series of recesses located in line with trailing edges of the vanes.

3. The stator ring according to claim 1, wherein said external surface comprises a series of recesses located in line with leading edges of the vanes and/or a series of recesses located in line with trailing edges of the vanes.

4. The stator ring according to claim 1, wherein the vanes are connected to the internal shroud fitted with recesses by webs of material which have a thickness Evoile-int less than or equal to Evirole-int/3, Evirole-int being a thickness of the internal shroud in an area comprising the recesses.

5. The stator ring according to claim 1, wherein the vanes are connected to the external shroud fitted with recesses by webs of material which have a thickness Evoile-ext less than or equal to Evirole-ext/2, Evirole-ext being a thickness of the external shroud in an area comprising the recesses.

6. The stator ring according to claim 1, wherein each of the recesses has a generally elongate shape along a camber line of a corresponding vane, each of the recesses having in cross-section and/or in longitudinal section a trapezoidal or triangular shape.

7. The stator ring according to claim 1, wherein each of the vanes is connected to the or each shroud fitted with recesses by two lateral webs of material which extend respectively towards the side of the intrados and of the extrados of the vane and which are symmetrical with respect to a median plane (P) passing through the middle of the recess and through an axis of elongation (Y) of the vane.

8. The stator ring according to claim 7, wherein the two webs of material extend from a first plane passing through the corresponding shroud to a second plane passing through one end of the corresponding vane, the first and second planes being parallel and at a distance from each other.

9. An aircraft turbine engine, comprising at least one stator ring according to claim 1.

* * * * *